(12) United States Patent
Shiga et al.

(10) Patent No.: US 9,006,346 B2
(45) Date of Patent: Apr. 14, 2015

(54) RESIN COMPOSITION FOR GOLF BALL AND GOLF BALL

(71) Applicant: Dunlop Sports Co. Ltd., Kobe-shi, Hyogo (JP)

(72) Inventors: Kazuki Shiga, Kobe (JP); Ryo Murakami, Kobe (JP); Yoshiyuki Ikeda, Kobe (JP)

(73) Assignee: Dunlop Sports Co., Ltd., Kobe (JP)

( * ) Notice: Subject to any disclaimer, the term of this patent is extended or adjusted under 35 U.S.C. 154(b) by 176 days.

(21) Appl. No.: 13/727,319

(22) Filed: Dec. 26, 2012

(65) Prior Publication Data

US 2013/0165263 A1 Jun. 27, 2013

(30) Foreign Application Priority Data

Dec. 27, 2011 (JP) ................. 2011-286109

(51) Int. Cl.
*A63B 37/00* (2006.01)
*C08F 220/12* (2006.01)
*C08F 220/06* (2006.01)
*C08F 120/10* (2006.01)
*C08F 220/18* (2006.01)

(52) U.S. Cl.
CPC ............ *C08F 120/10* (2013.01); *A63B 37/0039* (2013.01); *C08F 220/06* (2013.01); *C08F 2220/1808* (2013.01)

(58) Field of Classification Search
None
See application file for complete search history.

(56) References Cited

U.S. PATENT DOCUMENTS

| 2004/0121856 A1 | 6/2004 | Iwami |
| 2007/0049419 A1 | 3/2007 | Egashira et al. |
| 2008/0242447 A1 | 10/2008 | Egashira et al. |
| 2010/0009779 A1 | 1/2010 | Egashira et al. |
| 2012/0010347 A1 | 1/2012 | Egashira et al. |

FOREIGN PATENT DOCUMENTS

| JP | 06287395 | * 10/1994 |
| JP | 2004-187991 A | 7/2004 |
| JP | 2007-61605 A | 3/2007 |

OTHER PUBLICATIONS

Jiang; Compatibillization in Ionomer Blends; Polymer Bulletin 30(4); (1993) pp. 449-453.*

* cited by examiner

*Primary Examiner* — David Buttner
(74) *Attorney, Agent, or Firm* — Birch, Stewart, Kolasch & Birch, LLP

(57) ABSTRACT

The present invention provides a resin composition for a golf ball and a golf ball which have high resilience while maintaining soft compression and also have low spin on driver shots, and therefore can achieve a long flight distance. The present invention relates to a resin composition for a golf ball, including an ionomer resin consisting of a metal ion-neutralized copolymer of (A) a $C_{3-8}$ $\alpha,\beta$-unsaturated carboxylic acid and (B) a $C_{3-8}$ $\alpha,\beta$-unsaturated carboxylic acid ester, the ionomer resin having a mass ratio of (A)/(B) of 10/90 to 25/75, and a degree of neutralization of 30 to 105 mol %.

8 Claims, 2 Drawing Sheets

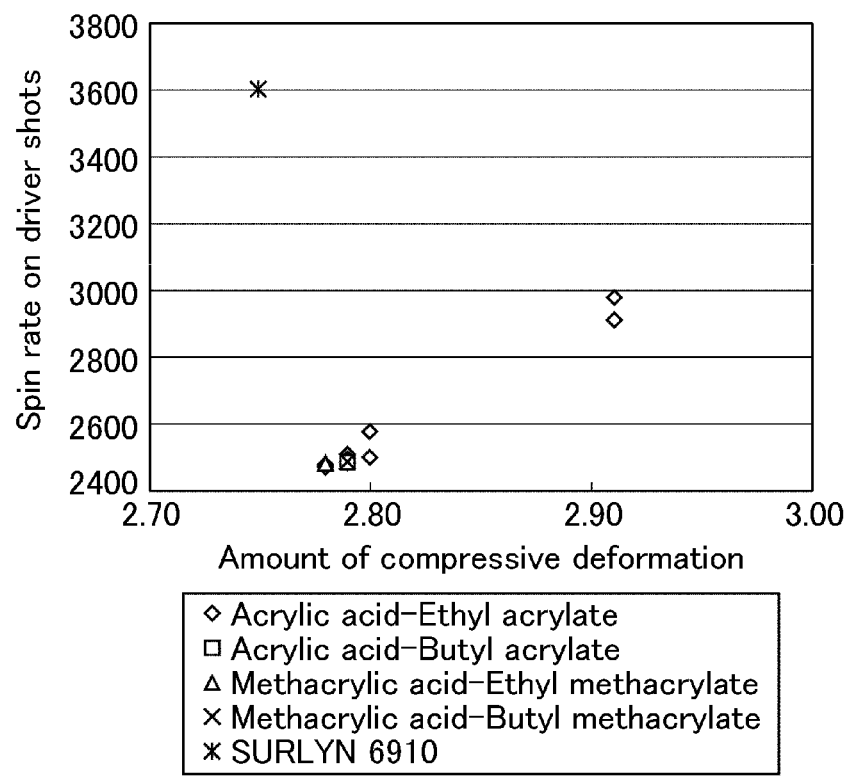

RESIN COMPOSITION FOR GOLF BALL AND GOLF BALL

TECHNICAL FIELD

The present invention relates to a resin composition for a golf ball and a golf ball formed from the same.

BACKGROUND ART

There is a need for materials for interlayers of golf balls which offer the properties of high resilience and low spin on driver shots and thereby enable a long flight distance. For example, some three-piece golf balls and multi-piece golf balls have been proposed which include a high rigid or high elastic interlayer so as to provide a high launch angle and a low spin and thereby enhance flight distance.

For example, Patent Literature 1 discloses a golf ball including an interlayer which contains a high elastic polyamide resin or a metal-neutralized ethylene-(meth)acrylic acid copolymer. Patent literature 2 also discloses a golf ball including an interlayer which contains a resin composition including an olefin-containing thermoplastic polymer and a diene polymer, and an oxygen-containing inorganic metal compound. Such interlayers provide high rigidity or high elasticity and thereby enable the golf balls to have improved performance such as flight performance.

In order to achieve a low spin on driver shots, a golf ball needs to be highly hard and be firm on the outer layer while becoming softer towards the center so that a recoil force can act effectively. Hence, there are proposed various materials which enable soft compression and sufficient hardness of interlayers at the same time. However, it is generally difficult to achieve high resilience while maintaining soft compression, and also achieve low spin on driver shots. Therefore, improvement is desired.

CITATION LIST

Patent Literature

Patent Literature 1: JP 2004-187991 A
Patent Literature 2: JP 2007-61605 A

SUMMARY OF INVENTION

Technical Problem

The present invention aims to solve the problem and to provide a resin composition for a golf ball and a golf ball which have high resilience while maintaining soft compression and also have low spin on driver shots and therefore can achieve a long flight distance.

Solution to Problem

The present invention relates to a resin composition for a golf ball, including an ionomer resin consisting of a metal ion-neutralized copolymer of (A) a $C_{3-8}$ α,β-unsaturated carboxylic acid and (B) a $C_{3-8}$ α,β-unsaturated carboxylic acid ester, the ionomer resin having a mass ratio of (A)/(B) of 10/90 to 25/75, and a degree of neutralization of 30 to 105 mol %.

In the ionomer resin, the mass ratio of (A)/(B) is preferably 15/85 to 25/75.

The ionomer resin preferably has a degree of neutralization of 50 to 105 mol %.

In a preferred embodiment of the ionomer resin, the (A) is at least one of an acrylic acid and a methacrylic acid, and the (B) is at least one of an acrylic acid ester and a methacrylic acid ester.

The metal ion is preferably a magnesium ion.

The $C_{3-8}$ α,β-unsaturated carboxylic acid (A) is preferably selected from the group consisting of an acrylic acid, a methacrylic acid, a fumaric acid, a maleic acid, and a crotonic acid.

The $C_{3-8}$ α,β-unsaturated carboxylic acid ester (B) is preferably selected from the group consisting of methyl, ethyl, propyl, n-butyl, or isobutyl esters of an acrylic acid, methacrylic acid, fumaric acid, or maleic acid.

The present invention relates to a golf ball including a member formed from the resin composition for a golf ball.

The present invention also relates to a golf ball including: a core including a center and one or more interlayers covering the center; and a cover covering the core, wherein at least one part or layer of the interlayers is formed from the resin composition for a golf ball.

Advantageous Effects of Invention

The present invention provides a resin composition for a golf ball, including an ionomer resin which consists of a metal ion-neutralized copolymer of (A) a $C_{3-8}$ α,β-unsaturated carboxylic acid and (B) a $C_{3-8}$ α,β-unsaturated carboxylic acid ester, and in which the mass ratio of (A) to (B) and the degree of neutralization are adjusted to the respective specific ranges; and a golf ball formed from the resin composition. Thus, it is possible to achieve high resilience while maintaining soft compression and also achieve low spin on driver shots, which can lead to a long flight distance.

BRIEF DESCRIPTION OF DRAWINGS

FIG. 3 is a graph illustrating the relations between the amount of compressive deformation and the spin rate on driver shots of the golf balls prepared in examples and comparative examples of the present invention.

DESCRIPTION OF EMBODIMENTS

Figure 1:
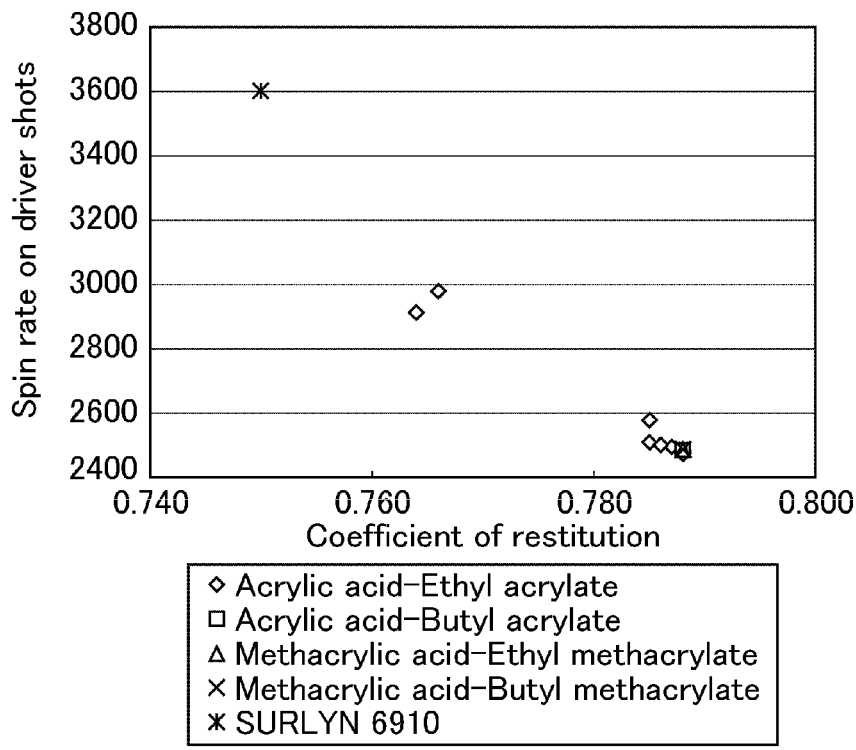
FIG. 1 is a graph illustrating the relations between the coefficient of restitution and the spin rate on driver shots of the golf balls prepared in examples and comparative examples of the present invention.
Figure 2:
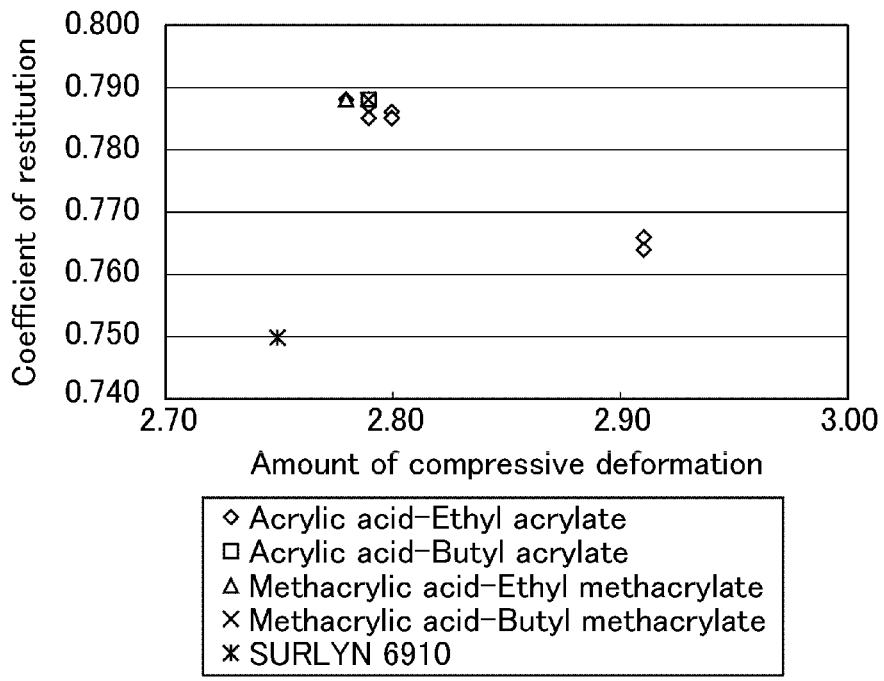
FIG. 2 is a graph illustrating the relations between the amount of compressive deformation and the coefficient of restitution of the golf balls prepared in examples and comparative examples of the present invention.

The resin composition for a golf ball of the present invention includes an ionomer resin which consists of a metal ion-neutralized copolymer of (A) a $C_{3-8}$ α,β-unsaturated carboxylic acid and (B) a $C_{3-8}$ α,β-unsaturated carboxylic acid ester, and in which the mass ratio of (A) to (B) and the degree of neutralization are adjusted to the respective specific ranges.

Use of a specific inomer resin containing no olefin unit enables low spin on driver shots while achieving soft compression and high coefficient of restitution. As a result, longer flight distance can be achieved than those of the conventional golf balls. This is supposedly because using an ionomer resin containing no olefin unit, instead of the conventional ethylenic inomer resin, for an interlayer material or the like provides high hardness and thereby allows a recoil force to occur effectively, while also providing low bending rigidity and thereby leading to soft compression (amount of compressive deformation).

First, the ionomer resin which is used as a resin component in the present invention and consists of a metal ion-neutralized copolymer of (A) a $C_{3-8}$ α,β-unsaturated carboxylic acid and (B) a $C_{3-8}$ α,β-unsaturated carboxylic acid ester is described.

The ionomer resin may be a metal ion-neutralized product of a binary copolymer of a $C_{3-8}$ α,β-unsaturated carboxylic acid and a $C_{3-8}$ α,β-unsaturated carboxylic acid ester, in which at least part of carboxyl groups in the copolymer are neutralized by a metal ion.

Examples of the $C_{3-8}$ α,β-unsaturated carboxylic acid include acrylic acid, methacrylic acid, fumaric acid, maleic acid, and crotonic acid, and particularly preferred is acrylic or methacrylic acid. Examples of the α,β-unsaturated carboxylic acid ester include methyl, ethyl, propyl, n-butyl, or isobutyl esters of acrylic acid, methacrylic acid, fumaric acid, maleic acid and the like, and particularly preferred are acrylic or methacrylic acid esters.

In the ionomer resin, the mass ratio of (A) the $C_{3-8}$ α,β-unsaturated carboxylic acid to (B) the $C_{3-8}$ α,β-unsaturated carboxylic acid ester ((A)/(B)) is 10/90 to 25/75, preferably 15/85 to 25/75, and more preferably 18/82 to 25/75, provided that (A)+(B) is 100% by mass. If the (A) content is 10% by mass or more, soft compression, high coefficient of restitution, and low spin on driver shots are exhibited. If the (A) content is 25% by mass or less, a golf ball to be obtained can have durability.

The ionomer resin has a degree of neutralization of carboxyl groups of 30 mol % or higher, preferably 50 mol % or higher, and more preferably 60 mol % or higher. The degree of neutralization is 105 mol % or lower, preferably 104 mol % or lower, and more preferably 103 mol % or lower. If the degree of neutralization is 30 mol % or higher, soft compression, high coefficient of restitution, and low spin on driver shots are exhibited. If the degree of neutralization is 105 mol % or lower, a golf ball to be obtained can have durability.

The degree of neutralization of carboxyl groups of the ionomer resin can be determined by the following formula:

Degree of neutralization of ionomer resin (mol %)= 100×(number of moles of metal ions in ionomer resin)×(valence of metal ions)/(total number of moles of carboxyl groups in ionomer resin).

Examples of metal ions usable for neutralizing at least part of carboxyl groups in the ionomer resin include: monovalent metal ions such as sodium, potassium, and lithium; bivalent metal ions such as magnesium, calcium, zinc, barium, and cadmium; trivalent metal ions such as aluminum; and other ions such as tin and zirconium. Especially, a magnesium ion is preferred because it is excellent in resilience, durability, and the like, and thus the effects of the invention can be sufficiently obtained.

The ionomer resin preferably has a bending rigidity of 140 MPa or higher, more preferably 150 MPa or higher, and still more preferably 160 MPa or higher. The bending rigidity is also preferably 550 MPa or lower, more preferably 500 MPa or lower, and still more preferably 450 MPa or lower. Too low a bending rigidity may cause reduced elasticity of the interlayer, leading to reduction in the effects of increasing launch angle and of lowering spin rate. Too high a bending rigidity may cause excessively high elasticity of the interlayer, leading to golf balls with reduced durability and deteriorated shot feeling. In the present invention, the bending rigidity refers to a value measured in accordance with ISO178.

The ionomer resin preferably has a slab hardness of 10 or higher, more preferably 15 or higher, and even more preferably 20 or higher in Shore D hardness. Also, the slab hardness (Shore D hardness) is preferably 90 or lower, more preferably 85 or lower, and even more preferably 82 or lower. If the slab hardness is 10 or higher, a member to be obtained can have favorable resilience. If the slab hardness is 90 or lower, a member to be obtained has moderate hardness, and the resulting golf ball can have better durability.

In the present invention, the ionomer resin is especially preferably a metal ion-neutralized copolymer of an acrylic acid and/or a methacrylic acid with an acrylic acid ester and/or a methacrylic acid ester. Such an ionomer resin offers soft compression, high coefficient of restitution, and low spin on driver shots, leading to a long flight distance.

In preferable embodiments, the resin component of the resin composition for a golf ball of the present invention consists only of the aforementioned ionomer resin. Still, the resin component may optionally contain other thermoplastic elastomer(s) and/or thermoplastic resin(s) to the extent that they do not impair the effects of the present invention. If the resin component contains other thermoplastic elastomer(s) and/or thermoplastic resin(s), the total amount of the ionomer resin is preferably 50% by mass or more, more preferably 60% by mass or more, and even more preferably 70% by mass or more of the resin component.

The resin composition for a golf ball of the present invention may further include any additives such as pigments including white pigments (e.g. titanium oxide) and blue pigments, weighting agents, dispersants, antioxidants, ultraviolet absorbents, light stabilizers, fluorescent materials, and fluorescent brighteners as long as the performance of golf balls is not impaired.

The resin composition for a golf ball of the present invention may be prepared, for example, by dry-blending the ionomer resin and optionally any additive. The dry-blended mixture may be extruded into pellets. The dry-blending is preferably performed using, for example, a mixer that can mix pelletized materials, and more preferably by a tumbler mixer. The extrusion may be performed using a known extruder such as a single-screw extruder, a twin-screw extruder, or a twin-screw/single-screw extruder.

The resin composition for a golf ball preferably has a bending rigidity of 140 MPa or higher, more preferably 150 MPa or higher, and even more preferably 160 MPa or higher. Also, the bending rigidity is preferably 550 MPa or lower, more preferably 500 MPa or lower, and even more preferably 450 MPa or lower. When the bending rigidity is 140 MPa or higher, the resulting interlayer has higher hardness, which causes an effect in increasing launch angle and in lowering spin rate. When the bending rigidity is 550 MPa or lower, the moldability of the composition is not deteriorated. In addition, the resulting interlayer has moderate hardness, and therefore a golf ball to be obtained can have favorable durability.

The resin composition for a golf ball preferably has a slab hardness of 15 or higher, more preferably 60 or higher, and even more preferably 68 or higher in Shore D hardness. The slab hardness is also preferably 90 or lower, more preferably 85 or lower, and even more preferably 82 or lower. When the slab hardness is 15 or higher, the resulting interlayer has higher hardness, which causes an effect in increasing launch angle and in lowering spin rate. When the slab hardness is 90 or lower, the resulting interlayer has moderate hardness, and therefore a golf ball to be obtained can have favorable durability. The slab hardness of the resin composition for a golf ball herein is a hardness measured after the resin composition for a golf ball is formed into a sheet, and is measured by the below-mentioned method.

Here, the slab hardness and the bending rigidity are measured by the below-mentioned methods. The slab hardness and the bending rigidity of the resin composition for a golf ball can be adjusted by appropriately selecting factors such as the type of the ionomer resin and its combination, and the amounts of additives.

The golf ball of the present invention is not particularly limited as long as it includes a member formed from the resin composition for a golf ball. Examples thereof include one-piece golf balls; two-piece golf balls including a monolayer core and a cover covering the monolayer core; three-piece golf balls including: a core that includes a center and a single interlayer covering the center, and a cover covering the core; and multi-piece golf balls (including the three-piece golf balls) including: a core that includes a center and one or more interlayers covering the center, and a cover covering the core, provided that any of the members of each golf ball is formed from the resin composition for a golf ball of the present invention. Preferred among these is a golf ball including: a core including a center and one or more interlayers covering the center, and a cover covering the core, in which at least one part or layer of the interlayers is formed from the resin composition for a golf ball.

One example of the golf ball of the present invention is described in detail based on, but not limited to, an embodiment of the golf ball including a core including a center and one or more interlayers covering the center, and a cover covering the core, in which at least one part or layer of the interlayers is formed from the resin composition for a golf ball.

First, the core used in the golf ball is described below.

Examples of the structure of the core of the golf ball of the present invention include a core including a center and a single interlayer covering the center, and a core including a center and a plurality of or multi-layered interlayer(s) covering the center. The core preferably has a spherical shape. A non-spherical core may lead to a non-uniform cover thickness and thereby cause a part of the cover to have reduced covering performance. Meanwhile, the center generally has a spherical shape. The spherical center may be provided with a linear protrusion(s) to divide the surface of the center. For example, a linear protrusion(s) may be provided to equally divide the surface of the spherical center. Examples of embodiments with the linear protrusion include an embodiment in which the surface of the spherical center is provided with a linear protrusion(s) that is integrated with the center, and an embodiment in which the surface of the spherical center is provided with linear protrusions as an intermediate layer.

If the spherical center is regarded as the earth, for example, the linear protrusions are preferably provided along the equator and any meridians which equally divide the surface of the spherical center. For example, when the surface of the spherical center is divided into 8 parts, linear protrusions may be provided along the equator, any meridian (0 degrees longitude) and the meridians at 90 degrees east longitude, 90 degrees west longitude, and 180 degrees east (west) longitude based on the meridian at 0 degrees longitude. If the linear protrusion(s) is provided, concave portions separated by the linear protrusion(s) are preferably filled by a plurality of interlayers, or a single interlayer that covers the concave portions, so that the core has a spherical shape. The cross-sectional shape of the linear protrusion is not particularly limited, and may be, for example, an arc, a substantially arc (for example, a shape in which a notch portion is formed at a part where the linear protrusions intersect one another or are at right angles to each other), or the like.

With regard to the interlayer, in the case that the center is covered with a single or multiple interlayers, at least one layer of the interlayers is formed from the resin composition for a golf ball. In the case that the concave portions separated by the linear protrusion provided on the surface of the center are filled by a plurality of interlayers, at least one of the plurality of interlayers is formed from the resin composition for a golf ball. Here, if the core includes a center and a plurality of interlayers or a multi-layered interlayer covering the center, the core may also include an interlayer formed from a composition for an interlayer other than the resin composition for a golf ball, as long as it does not impair the effects of the present invention. In this case, the outermost layer of the core is preferably an interlayer formed from the resin composition for a golf ball. Preferably, all of the plurality of interlayers or of the multi-layered interlayer is formed from the resin composition for a golf ball.

Examples of the interlayer composition other than the resin composition for a golf ball include thermoplastic polyamide elastomers commercially available from Arkema under the trade name of "Pebax (registered trademark)" (e.g. "Pebax 2533"), thermoplastic polyester elastomers commercially available from Du Pont-Toray Co., Ltd. under the trade name of "Hytrel (registered trademark)" (e.g. "Hytrel 3548" and "Hytrel 4047"), thermoplastic polyurethane elastomers commercially available from BASF Japan Ltd. under the trade name of "Elastollan (registered trademark)" (e.g. Elastollan XNY97A), and thermoplastic polystyrene elastomers commercially available from Mitsubishi Chemical Corporation under the trade name of "RABALON (registered trademark)". Further, the composition may contain additives including weighting agents such as barium sulfate and tungsten, antioxidants, and pigments.

As for the method of forming the interlayer, an interlayer is formed, for example, by covering the center with the resin composition for a golf ball and another interlayer composition. The method of forming the interlayer is not particularly limited. Examples thereof include a method in which the resin composition for a golf ball is previously molded into hemispherical half-shells, and a center is then covered by two of the obtained half-shells, followed by pressure-molding it at 130 to 170° C. for 1 to 5 minutes; and a method in which the resin composition for a golf ball is injection-molded directly on a center to cover it.

The thickness of the interlayer to be formed is preferably set to 3.0 mm or thinner, more preferably 2.5 mm or thinner, and even more preferably 2.0 mm or thinner. Also, the thickness is preferably set to 0.1 mm or thicker, more preferably 0.5 mm or thicker, and even more preferably 0.8 mm or thicker. When the thickness of the interlayer is 3.0 mm or thinner, reduction in resilience of the golf ball and deterioration in shot feeling can be suppressed. When the thickness is 0.1 mm or thicker, a golf ball to be obtained can have favorable durability.

For the center, a conventionally known rubber composition (hereinafter, also referred to simply as "a rubber composition for a center") can be used. The center can be formed by hot-pressing a rubber composition containing a base rubber, a crosslinking initiator, and a co-crosslinking agent, and filler, for example.

As the base rubber, natural rubber and/or synthetic rubber can be used. Examples thereof include polybutadiene rubber, natural rubber, polyisoprene rubber, styrene polybutadiene rubber, and ethylene-propylene-diene rubber (EPDM). Among these, it is particularly preferable to use a high-cis polybutadiene having 40% by mass or more, preferably 70% by mass or more, and more preferably 90% by mass or more, of cis bonds which are beneficial to resilience.

The crosslinking initiator is intended to be added to crosslink the base rubber component. As the crosslinking initiator, organic peroxides are preferred. Specific examples thereof include dicumyl peroxide, 1,1-bis(t-butylperoxy)-3,5-trimethylcyclohexane, 2,5-dimethyl-2,5-di(t-butylperoxy) hexane, di-t-butyl peroxide, and other organic peroxides. Among these, dicumyl peroxide is preferably used. The amount of the crosslinking initiator is preferably 0.3 parts by mass or more, and more preferably 0.4 parts by mass or more, per 100 parts by mass of the base rubber. Also, the amount is preferably 5 parts by mass or less, and more preferably 3 parts by mass or less. If the amount is less than 0.3 parts by mass, the resulting core tends to be too soft, leading to reduced resilience. If the amount is more than 5 parts by mass, increased amount of the co-crosslinking agent is needed to provide appropriate hardness, and the resilience is likely to be insufficient.

The co-crosslinking agent is not particularly limited, as long as it serves to graft-polymerize onto molecular chains of the base rubber to crosslink the rubber molecules. Example thereof include $C_{3-8}$ $\alpha,\beta$-unsaturated carboxylic acids and metal salts thereof. Preferred are an acrylic acid, a methacrylic acid, and metal salts thereof. Examples of metals forming the metal salts include zinc, magnesium, calcium, aluminum, and sodium. Zinc is preferably used because it increases resilience.

The amount of the co-crosslinking agent is preferably 10 parts by mass or more, more preferably 15 parts by mass or more, and even more preferably 20 parts by mass or more, per 100 parts by mass of the base rubber. Also, the amount is preferably 55 parts by mass or less, more preferably 50 parts by mass or less, and even more preferably 48 parts by mass or less. If the amount of the co-crosslinking agent is less than 10 parts by mass, increased amount of the crosslinking initiator is needed to provide appropriate hardness, and thus resilience is likely to be reduced. If the amount of the co-crosslinking agent is more than 55 parts by mass, the resulting center may be too hard, leading to deterioration of shot feeling.

The filler that may be contained in the rubber composition for a center is mainly intended to be added as a weighting agent in order to adjust the specific gravity of a golf ball to be obtained as the final product into a range of 1.0 to 1.5, and may be added as needed. Examples of the filler include inorganic fillers such as zinc oxide, barium sulfate, calcium carbonate, magnesium oxide, tungsten powder, and molybdenum powder. The amount of the filler is 0.5 parts by mass or more, preferably 1 part by mass or more, per 100 parts by mass of the base rubber. Also, the amount is 30 parts by mass or less, and preferably 20 parts by mass or less. If the amount of the filler is less than 0.5 parts by mass, adjustment of the weight tends to be difficult. If the amount is more than 30 parts by mass, the weight fraction of the rubber component tends to be small, leading to reduced resilience.

The rubber composition for a center may appropriately contain an organic sulfur compound, an antioxidant, a peptizer, and/or the like, in addition to the base rubber, the crosslinking initiator, the co-crosslinking agent, and the filler.

As the organic sulfur compound, diphenyl disulfides can be suitably used. Examples of the diphenyl disulfides include diphenyl disulfide; mono-substituted products thereof such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, and bis(4-cyanophenyl)disulfide; di-substituted products thereof such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl) disulfide, bis(2-chloro-5-bromophenyl)disulfide, and bis(2-cyano-5-bromophenyl)disulfide; tri-substituted products thereof such as bis(2,4,6-trichlorophenyl)disulfide, and bis(2-cyano-4-chloro-6-bromophenyl)disulfide; tetra-substituted products thereof such as bis(2,3,5,6-tetrachlorophenyl) disulfide; and penta-substituted products thereof such as bis (2,3,4,5,6-pentachlorophenyl)disulfide, and bis(2,3,4,5,6-pentabromophenyl)disulfide. These diphenyl disulfides have some influence on the state of cure of the rubber vulcanizate and thereby enhance resilience. Among them, diphenyl disulfide and bis(pentabromophenyl)disulfide are preferred because they can allow golf balls to have especially high resilience. The amount of the organic sulfur compound is preferably 0.1 parts by mass or more, and more preferably 0.3 parts by mass or more, per 100 parts by mass of the base rubber. Also, the amount is preferably 5.0 parts by mass or less, and more preferably 3.0 parts by mass or less.

Preferably, the amount of the antioxidant is 0.1 parts by mass or more but is 1 part by mass or less, per 100 parts by mass of the base rubber. Preferably, the amount of the peptizer is 0.1 parts by mass or more but is 5 parts by mass or less, per 100 parts by mass of the base rubber.

The center can be obtained by mixing and kneading the rubber composition and molding the resultant mixture in a mold. The conditions during molding are not particularly limited. Generally, molding is performed at 130 to 180° C. under a pressure of 2.9 MPa to 11.8 MPa for 10 to 40 minutes. Preferably, for example, the rubber composition may be heated at 130 to 200° C. for 10 to 60 minutes, or the composition may be heated in 2 steps of: heating at 130 to 150° C. for 20 to 40 minutes; and then heating at 160 to 180° C. for 5 to 15 minutes.

The center preferably has a diameter of 25 mm or greater, and more preferably 30 mm or greater. Also, the diameter is preferably 41 mm or smaller, and more preferably 40 mm or smaller. If the diameter of the center is smaller than 25 mm, the interlayer or cover layer needs to be thicker than desired, which may lead to reduced resilience. If the diameter is greater than 41 mm, the interlayer or cover layer needs to be thinner than desired, and therefore the function of the interlayer or cover layer cannot be expressed sufficiently.

In the case that the center has a diameter of 25 to 41 mm, the amount of compressive deformation (shrink in the compression direction) of the center under a load from an initial load of 98 N to a final load of 1275 N is preferably 1.5 mm or greater, and more preferably 2.0 mm or greater. The amount of compressive deformation is also preferably 5.0 mm or smaller, and more preferably 4.0 mm or smaller. If the amount of compressive deformation is smaller than 1.5 mm, a hard and bad shot feeling may be obtained. If the amount of compressive deformation is greater than 5.0 mm, resilience may be reduced.

The center preferably has a surface hardness Hs1 of 40 or higher, more preferably 48 or higher, and even more preferably 54 or higher in Shore D hardness. Also, the surface hardness is preferably 75 or lower, more preferably 67 or lower, and even more preferably 64 or lower. If the surface hardness Hs1 of the center is lower than 40 in Shore D hardness, the surface tends to be too soft, leading to reduced resilience and shorter flight distance. If the surface hardness Hs1 of the center is higher than 75 in Shore D hardness, the surface may be too hard, leading to poor shot feeling.

The core of the golf ball of the present invention preferably has a diameter of 30 mm or greater, more preferably 35 mm or greater, and even more preferably 37 mm or greater. When the diameter of the core is 30 mm or greater, the cover has moderate thickness and a golf ball to be obtained can have favorable resilience. Also, the diameter of the core is preferably 41.5 mm or smaller, more preferably 41.25 mm or smaller, and even more preferably 41.0 mm or smaller. When the diameter of the core is 41.5 mm or smaller, the cover can have an appropriate thickness and provide sufficient protection.

In a preferred embodiment of the core of the golf ball of the present invention, the surface hardness Hs of the core is higher than the central hardness Ho thereof. The core preferably has a difference (Hs−Ho) between the surface hardness Hs and the central hardness Ho of 10 or larger, more preferably 15 or larger, and particularly preferably 20 or larger in Shore D hardness. When the surface hardness of the core is higher than the central hardness thereof, high launch angle and low spin rate are obtained and therefore flight distance can be enhanced. Also, the core preferably has a difference between the surface hardness Hs and the central hardness Ho of 55 or smaller, more preferably 50 or smaller, and particularly preferably 40 or smaller in Shore D hardness. Too large a difference may lead to reduced durability.

Further, the core preferably has a central hardness Ho of 20 or higher, more preferably 27 or higher, and even more preferably 32 or higher in Shore D hardness. When the central hardness Ho of the core is 20 or higher in Shore D hardness, the core has moderate softness and favorable resilience can be obtained. Also, the central hardness Ho of the core is preferably 60 or lower, more preferably 53 or lower, and even more preferably 48 or lower in Shore D hardness. When the central hardness Ho is 60 or lower in Shore D hardness, the core has moderate hardness and favorable shot feeling can be obtained. In the present invention, the central hardness of the core means a hardness measured as follows: the core is divided into two equal parts, and the hardness is then measured at the central point of the cross section using a spring type Shore D hardness tester.

The core of the golf ball of the present invention preferably has a surface hardness Hs of 40 or higher, more preferably 48 or higher, and even more preferably 54 or higher in Shore D hardness. When the surface hardness Hs is 40 or higher in Shore D hardness, the core has moderate softness and favorable resilience can be obtained. Also, the surface hardness Hs of the core is preferably 75 or lower, more preferably 67 or lower, and even more preferably 64 or lower in Shore D hardness. When the surface hardness Hs is 75 or lower in Shore D hardness, the core has moderate hardness and favorable shot feeling can be obtained.

In the following, the cover of the golf ball of the present invention is described. Examples of a resin component usable in a cover composition forming the cover include, in addition to polyurethane resins and conventionally known ionomer resins, thermoplastic polyamide elastomers available from Arkema under the trade name "Pebax (registered trademark) (e.g. "Pebax 2533")", thermoplastic polyester elastomers available from DU PONT-TORAY CO., LTD. under the trade name "Hytrel (registered trademark) (e.g. "Hytrel 3548" and "Hytrel 4047")", and thermoplastic polystyrene elastomers available from Mitsubishi Chemical Corp. under the trade name "RABALON (registered trademark)". Each of these resins may be used alone, or two or more of these may be used in combination. Among these, polyurethane resins are preferred.

The cover composition forming the cover of the golf ball of the present invention preferably contains a resin component including 50% by mass or more of, more preferably 60% by mass or more of, and even more preferably 70% by mass or more of a polyurethane resin. Most preferably, the resin component of the cover composition consists only of a polyurethane resin.

The polyurethane resin is not particularly limited, as long as it has a plurality of urethane bonds per molecule. Examples thereof include products obtained by the reaction of a polyisocyanate component and a high-molecular-weight polyol component to form an urethane bond in the molecule, optionally followed by chain-lengthening with a low-molecular-weight polyol, a low-molecular-weight polyamine, or the like.

The polyurethane resin preferably has a slab hardness of 10 or higher, more preferably 20 or higher, and even more preferably 30 or higher in Shore D hardness. Also, the slab hardness is preferably 65 or lower, more preferably 60 or lower, and even more preferably 55 or lower. A polyurethane resin having too low a harness may lead to increased spin rate on driver shots. A polyurethane resin having too high a hardness may lead to excessively low spin rate on approach wedge shots. Specific examples of the polyurethane resin include Elastollan (registered trademark) XNY90A, XNY75A, and ET880, produced by BASF Japan Ltd.

In the present invention, the cover may contain, in addition to the aforementioned resin component, any of the following components: pigments such as titanium oxide, blue pigments, and red pigments, weighting agents such as zinc oxide, calcium carbonate, and barium sulfate, dispersants, antioxidants, ultraviolet absorbents, light stabilizers, fluorescent materials, and fluorescent brighteners, to the extent that they do not impair the performance of the cover.

The amount of the white pigment (titanium oxide) is preferably 0.5 parts by mass or more, and more preferably 1 part by mass or more, per 100 parts by mass of the resin component for the cover. The amount is also preferably 10 parts by mass or less, and more preferably 8 parts by mass or less. When the amount of the white pigment is 0.5 parts by mass or more, the hiding properties can be imparted to the cover. If the amount of the white pigment exceeds 10 parts by mass, the durability of the cover may be reduced.

The cover composition preferably has a slab hardness of 60 or lower, more preferably 53 or lower, and even more preferably 48 or lower in Shore D hardness. When the cover composition has a slab hardness of 60 or lower, the spin rate stability on approach shots with a short iron or the like is enhanced. As a result, a golf ball excellent in controllability on approach shots can be obtained. In order to obtain a sufficient spin rate on approach shots, the cover composition preferably has a slab hardness of 20 or higher, more preferably 27 or higher, and even more preferably 32 or higher in Shore D hardness.

The method for molding the cover composition into a cover is not particularly limited, and examples thereof include a method in which the cover composition is injection-molded directly onto a core; and a method in which the cover composition is molded into hollow shells, and a core is covered with a plurality of shells and then compression-molded (preferably, a method in which the cover composition is molded into hollow half-shells, and a core is covered with two half-shells and then compression-molded). In the case of injection-molding the cover composition onto a core to form a cover, upper and lower molds for forming a cover each preferably have a hemispherical cavity with pimples some of which also serve as retractable hold pins. A cover can be formed by injection molding as follows: the hold pins are protruded; a core is put into the mold and held by the pins; then, the cover composition heat-melted is injected thereon and cooled to form a cover. For example, the cover composition heat-melted to 150 to 230° C. is injected in 0.1 to 1 seconds into the mold clamped under a pressure of 980 KPa to 1500 KPa, and then the composition is cooled for 15 to 60 seconds and the mold is opened to obtain a cover.

In the case that the cover is formed by compression molding, half-shells can be formed by either compression molding or injection molding, and compression molding is preferred. The conditions for compression-molding the cover composition into half-shells may be, for example, under a pressure of at least 1 MPa but not more than 20 MPa at a molding temperature of at least −20° C. not more than 70° C. with respect to the flow beginning temperature of the cover composition. Under these molding conditions, half-shells having a uniform thickness can be formed. Examples of the method for forming a cover from half-shells include a method of covering a core with two half-shells and subjecting them to compression molding. The conditions for compression-molding half-shells to form a cover may be, for example, under a molding pressure of at least 0.5 but not more than 25 MPa at a molding temperature of at least −20° C. but not more than 70° C. with respect to the flow beginning temperature of the cover composition. Under these molding conditions, covers for golf balls having a uniform thickness can be formed.

The golf ball body with the cover thus formed is taken out from the mold and is preferably subjected to a surface treatment such as deburring, cleaning, and sandblasting as needed. If desired, a paint layer or a mark may be formed. The thickness of the paint layer is not particularly limited, and is preferably 5 μm or thicker, and more preferably 7 μm or thicker. Also, the thickness is preferably 25 μm or thinner, and more preferably 18 μm or thinner. This is because if the layer thickness is thinner than 5 μm, the paint layer is more likely to wear out and disappear after continuous use, while if the layer thickness is thicker than 25 μm, dimples have reduced effect and therefore the resulting golf ball has reduced flight performance.

In the present invention, the cover of the golf ball preferably a thickness of 3 mm or thinner, more preferably 2.5 mm or thinner, and even more preferably 2 mm or thinner. When the thickness of the cover is 3 mm or thinner, better resilience and shot feeling can be obtained. Also, the thickness of the cover is preferably 0.1 mm or thicker, more preferably 0.2 mm or thicker, and even more preferably 0.3 mm or thicker. If the thickness is thinner than 0.1 mm, the cover may be difficult to form, and the cover may also have reduced durability and abrasion resistance.

In the present invention, among the golf balls including a core including a center and one or more interlayers covering the center, and a cover covering the core, in which at least one part or layer of the interlayers is formed from the resin composition for a golf ball, most preferred are three-piece golf balls including a core including a center and a single interlayer covering the center, and a cover covering the core, in which the interlayer is formed from the resin composition for a golf ball.

In the case that the golf ball of the present invention has a diameter of 40 to 45 mm, the amount of compressive deformation (shrink in the compression direction) of the golf ball under a load from an initial load of 98 N to a final load of 1275 N is preferably 2.0 mm or greater, more preferably 2.1 mm or greater, and even more preferably 2.2 mm or greater. Also, the amount of compressive deformation is preferably 4.2 mm or smaller, more preferably 4.1 mm or smaller, and even more preferably 4.0 mm or smaller. When the amount of compressive deformation is 2.0 mm or greater, favorable shot feeling can be obtained. When the amount of compressive deformation is 4.2 mm or smaller, favorable resilience can be obtained.

EXAMPLES

The present invention will be described in detail referring to, but not limited to, examples.
[Evaluation Methods]
(1) Slab Hardness (Shore D Hardness)

The resin composition for a golf ball was hot press-molded into a sheet having a thickness of about 2 mm, and the sheet was stored at 23° C. for 2 weeks. Three or more pieces of the sheet were stacked on one another so as not to be affected by the measurement substrate and the like, and the slab hardness of the stack was measured using a P1-series auto hardness tester (from KOBUNSHI KEIKI CO., LTD.) including a spring type Shore D hardness tester in conformity with ASTM-D 2240.
(2) Bending Rigidity (MPa)

A test sample (length: 80.0±2 mm, width: 10.0±0.2 mm, thickness: 4.0±0.2 mm) was prepared by injection-molding the resin composition for a golf ball. The test sample was stored at 23° C. for 2 weeks. Then, the bending rigidity of the test sample sheet was measured according to ISO178. The measurement was performed at a temperature of 23° C. and a humidity of 50% RH.
(3) Hardness of Center and Core (Shore D Hardness)

Using a P1-series auto rubber hardness tester (from KOBUNSHI KEIKI CO., LTD.) including a spring type Shore D hardness tester in conformity with ASTM-D 2240, the Shore D hardness at the surface of a center and of a core was determined as a center surface hardness Hs1 and a core surface hardness Hs, respectively. In addition, the core was cut into hemispheres and the Shore D hardness at the central point of the cross section was determined as a core central hardness Ho.
(4) Amount of Compressive Deformation (Compression, mm)

A golf ball or core was compressed under a load from an initial load of 98 N to a final load of 1275 N, and the amount of deformation in the compression direction (the amount of shrink in the compression direction) of the golf ball or core was measured.
(5) Coefficient of Restitution A 198.4-g metal cylinder was allowed to collide with each golf ball at a speed of 40 m/sec. The speeds of the cylinder and the golf ball before and after the collision were measured. Based on these speeds and weights, the coefficient of restitution of each golf ball was calculated. Each golf ball was subjected to the measurement 12 times, and their average value was treated as the coefficient of restitution for the golf ball in question.
(6) Driver Shots Each golf ball was hit at a head speed of 50 m/sec with a metal head driver W#1 (XXIO S, loft angle: 11°, produced by SRI Sports Ltd.) attached to a swing robot M/C (produced by Golf Laboratories). The spin rate immediately after hitting was measured. Each golf ball was subjected to the measurement 12 times, and their average value was treated as the measured value of the golf ball in question. Here, the spin rate of a golf ball immediately after hitting it was measured by taking serial photographs of the golf ball hit.
(7) Approach Wedge Shots Each golf ball was hit at a head speed of 21 m/sec with a sand wedge attached to a swing robot M/C (produced by Golf Laboratories). Each golf ball was subjected to the measurement 12 times, and their average value was treated as the spin rate of the golf ball in question.

[Preparation of Golf Ball]

(1) Preparation of Center

A rubber composition was prepared by mixing the materials shown in Table 1. The rubber composition was subjected to hot-pressing in upper and lower molds each having a hemispherical cavity at 170° C. for 30 minutes to form a center.

TABLE 1

| Center composition | | |
|---|---|---|
| Formulation | Polybutadiene rubber | 100 |
| | Zinc acrylate | 28.5 |
| | Zinc oxide | 5 |
| | Barium sulfate | Q.S.*⁾ |
| | Diphenyl disulfide | 0.3 |
| | Dicumyl peroxide | 0.9 |
| Physical properties | Diameter (mm) | 39.8 |
| | Surface hardness Hs1 (Shore D hardness) | 52 |
| | Amount of compressive deformation (mm) | 3.3 |

Formulation: parts by mass
*⁾The amount was adjusted depending on the particular cover composition to provide a golf ball having a mass of 45.4 g.
Polybutadiene rubber: "BR-730 (high-cis polybutadiene)" produced by JSR Corporation
Zinc acrylate: "ZNDA-90S" produced by Nihon Jyoryu Kogyo Co., Ltd.
Zinc oxide: "GINREI R" produced by Toho Zinc Co., Ltd.
Barium sulfate: "Barium Sulfate BD" produced by Sakai Chemical Industry Co., Ltd.
Diphenyl disulfide: product of Sumitomo Seika Chemicals Co., Ltd.
Dicumyl peroxide: "PERCUMYL (registered trademark) D" produced by NOF CORPORATION Barium sulfate was appropriately added so that a golf ball to be obtained had a mass of 45.4 g.

(2) Preparation of Cover Composition

A pelletized cover composition was prepared by mixing the materials shown in Table 2 using a twin-screw mixing extruder under the extrusion conditions of: screw diameter 45 mm, screw rotation speed 200 rpm, and screw L/D ratio 35. Here, the mixture was heated at 160 to 230° C. in the die of the extruder.

TABLE 2

| Cover composition | | |
|---|---|---|
| Formulation | Elastollan XNY85A | 100 |
| | Titanium oxide | 4 |
| Physical property | Slab hardness (Shore D hardness) | 32 |

Formulation: parts by mass
Elastollan XNY85A: thermoplastic polyurethane elastomer produced by BASF Japan Ltd.

(3) Preparation of Interlayer Composition

As shown in Table 3, monomers were mixed (on the scale of about 500 g in total). Then, 0.6% by mass of AIBN was added to the mixture. Here, acetone having twice the mass of the monomers was used as a solvent. The resultant mixture was then subjected to a reaction at 80° C. for 60 minutes under stirring in a nitrogen atmosphere. After that, magnesium hydroxide was added according to Table 3. The resultant mixture was kneaded at 160° C. for 15 minutes using a kneader and then press-molded at 160° C. to prepare an interlayer composition.

TABLE 3

| Interlayer composition No. | | 1 | 2 | 3 | 4 | 5 | 6 | 7 | 8 | 9 | 10 | 11 | 12 | 13 | 14 | 15 | 16 (SURLYN 6910) |
|---|---|---|---|---|---|---|---|---|---|---|---|---|---|---|---|---|---|
| Ethylene | (% by mass) | | | | | | | | | | | | | | | | 85 |
| Acrylic acid | (% by mass) | 10 | 15 | 18 | 20 | 22 | 25 | 30 | 20 | 20 | 20 | 20 | 20 | 20 | | | |
| Ethyl acrylate | (% by mass) | 90 | 85 | 82 | 80 | 78 | 75 | 70 | 80 | 80 | 80 | 80 | 80 | | | | |
| Butyl acrylate | (% by mass) | | | | | | | | | | | | | 80 | | | |
| Methacrylic acid | (% by mass) | | | | | | | | | | | | | | 20 | 20 | 15 |
| Ethyl methacrylate | (% by mass) | | | | | | | | | | | | | | 80 | | |
| Butyl methacrylate | (% by mass) | | | | | | | | | | | | | | | 80 | |
| Metal for neutralization | | Mg | Mg | Mg | Mg | Mg | Mg | Mg | Mg | Mg | Mg | Mg | Mg | Mg | Mg | Mg | Mg |
| Degree of neutralization | (mol %) | 100 | 100 | 100 | 100 | 100 | 100 | 100 | 30 | 50 | 80 | 105 | 110 | 100 | 100 | 100 | 30 |

Acrylic acid: product of Wako Pure Chemical Industries, Ltd.
Ethyl acrylate: product of Wako Pure Chemical Industries, Ltd.
Butyl acrylate: product of Wako Pure Chemical Industries, Ltd.
Methacrylic acid: product of Wako Pure Chemical Industries, Ltd.
Ethyl methacrylate: product of Wako Pure Chemical Industries, Ltd.
Butyl methacrylate: product of Wako Pure Chemical Industries, Ltd.
Acetone: product of Wako Pure Chemical Industries, Ltd.
AIBN (azobisisobutyronitrile): product of Wako Pure Chemical Industries, Ltd.
Magnesium hydroxide: product of Wako Pure Chemical Industries, Ltd.
SURLYN 6910: product of Du Pont (4) Preparation of Golf Ball Body Each interlayer composition obtained above was injection-molded onto the center obtained as described above to form an interlayer covering the center. Thus, a spherical core was prepared. Then, the cover composition was injection-molded onto the spherical core to form a cover. Thus, a golf ball was prepared. The upper and lower molds used for the molding each had a hemispherical cavity with pimples some of which also served as retractable hold pins. The hold pins were protruded, the core was put into the mold and held by the pins, and then the resin composition heated to 210° C. was injected in 0.3 seconds into the mold clamped under a pressure of 80 t. After that, the composition was cooled for 30 seconds and the mold was opened to take out a golf ball. The surface of the obtained golf ball body was sandblasted and marked. Then a clear paint was applied and dried in an oven at 40° C. Thus, a golf ball having a diameter of 42.8 mm and a mass of 45.4 g was obtained.

The thus obtained golf balls were evaluated for the coefficient of restitution, the amount of compressive deformation, and the like. Table 4 shows the results.

6910, these golf balls had greatly improved properties. Also, the golf balls Nos. 13 to 15, in which the monomer(s) were changed to another $\alpha,\beta$-unsaturated carboxylic acid and/or another $\alpha,\beta$-unsaturated carboxylic acid ester, exhibited a similar performance improvement effect. In contrast, the golf balls Nos. 7 and 12, in which the acrylic acid content and the degree of neutralization were adjusted to 30% by mass and 110 mol %, respectively, were broken and could not be measured.

INDUSTRIAL APPLICABILITY

The present invention relates to a resin composition for a golf ball and a golf ball. Specifically, the present invention is useful in golf balls excellent in flight distance.

The invention claimed is:

1. A golf ball, comprising a member formed from a resin composition for a golf ball, comprising an ionomer resin consisting of a metal ion-neutralized copolymer of (A) a $C_{3-8}$ $\alpha,\beta$-unsaturated carboxylic acid and (B) a $C_{3-8}$ $\alpha,\beta$-unsaturated carboxylic acid ester, the ionomer resin having a mass ratio of (A)/(B) of 10/90 to 25/75, and a degree of neutralization of 30 to 105 mol %.

2. The golf ball according to claim 1, wherein the mass ratio of (A)/(B) is 15/85 to 25/75.

TABLE 4

| | Golf ball No. | | 1 | 2 | 3 | 4 | 5 | 6 | 7 | 8 |
|---|---|---|---|---|---|---|---|---|---|---|
| Core | Center | Diameter (mm) | 39.8 | 39.8 | 39.8 | 39.8 | 39.8 | 39.8 | 39.8 | 39.8 |
| | Interlayer | Interlayer composition No. | 1 | 2 | 3 | 4 | 5 | 6 | 7 | 8 |
| | | Slab physical properties Hardness (ShoreD) | 18 | 70 | 75 | 79 | 80 | 81 | 81 | 20 |
| | | Bending rigidity (MPa) | 2 | 162 | 186 | 201 | 207 | 211 | 222 | 3 |
| | | Thickness (mm) | 1.0 | 1.0 | 1.0 | 1.0 | 1.0 | 1.0 | 1.0 | 1.0 |
| | | Central hardness Ho (Shore D hardness) | 38 | 38 | 38 | 38 | 38 | 38 | 38 | 38 |
| | | Surface hardness Hs (Shore D hardness) | 52 | 52 | 52 | 52 | 52 | 52 | 52 | 52 |
| | | Amount of compressive deformation (mm) | 3.3 | 3.3 | 3.3 | 3.3 | 3.3 | 3.3 | 3.3 | 3.3 |
| Cover | | Thickness (mm) | 0.5 | 0.5 | 0.5 | 0.5 | 0.5 | 0.5 | 0.5 | 0.5 |
| Body evaluation | | Amount of compressive deformation SCH (mm) | 2.91 | 2.8 | 2.79 | 2.78 | 2.79 | 2.78 | 2.78 | 2.91 |
| | | Coefficient of resutitution | 0.766 | 0.785 | 0.785 | 0.788 | 0.788 | 0.788 | Unmeasurable (broken) | 0.764 |
| | | Spin rate on driver shots (rpm, 50 m/s) | 2980 | 2580 | 2512 | 2480 | 2486 | 2474 | | 2913 |
| | | Spin rate on approach shots (rpm, 21 m/s Dry) | 7320 | 7024 | 7020 | 7020 | 7016 | 7014 | | 7267 |

| | Golf ball No. | | 9 | 10 | 11 | 12 | 13 | 14 | 15 | 16 |
|---|---|---|---|---|---|---|---|---|---|---|
| Core | Center | Diameter (mm) | 39.8 | 39.8 | 39.8 | 39.8 | 39.8 | 39.8 | 39.8 | 39.8 |
| | Interlayer | Interlayer composition No. | 9 | 10 | 11 | 12 | 13 | 14 | 15 | 16 |
| | | Slab physical properties Hardness (ShoreD) | 71 | 76 | 80 | 80 | 77 | 80 | 78 | 63 |
| | | Bending rigidity (MPa) | 169 | 192 | 211 | 219 | 198 | 200 | 198 | 234 |
| | | Thickness (mm) | 1.0 | 1.0 | 1.0 | 1.0 | 1.0 | 1.0 | 1.0 | 1.0 |
| | | Central hardness Ho (Shore D hardness) | 38 | 38 | 38 | 38 | 38 | 38 | 38 | 38 |
| | | Surface hardness Hs (Shore D hardness) | 52 | 52 | 52 | 52 | 52 | 52 | 52 | 52 |
| | | Amount of compressive deformation (mm) | 3.3 | 3.3 | 3.3 | 3.3 | 3.3 | 3.3 | 3.3 | 3.3 |
| Cover | | Thickness (mm) | 0.5 | 0.5 | 0.5 | 0.5 | 0.5 | 0.5 | 0.5 | 0.5 |
| Body evaluation | | Amount of compressive deformation SCH (mm) | 2.8 | 2.79 | 2.78 | 2.77 | 2.79 | 2.78 | 2.79 | 2.75 |
| | | Coefficient of resutitution | 0.786 | 0.787 | 0.788 | Unmeasurable (broken) | 0.788 | 0.788 | 0.788 | 0.75 |
| | | Spin rate on driver shots (rpm, 50 m/s) | 2503 | 2498 | 2481 | | 2488 | 2485 | 2490 | 3600 |
| | | Spin rate on approach shots (rpm, 21 m/s Dry) | 7010 | 7018 | 7024 | | 7023 | 7022 | 7015 | 7012 |

Formulation: parts by mass

The golf balls Nos. 1 to 6 and 8 to 11, which contained an ionomer resin which was a magnesium-neutralized copolymer of an acrylic acid and ethyl acrylate and had a predetermined ratio of these monomers and a predetermined degree of neutralization, had high resilience while maintaining soft compression, and also had low spin on driver shots. Compared with the golf ball No. 16, which contained SURLYN 3. The golf ball according to claim 1, wherein the ionomer resin has a degree of neutralization of 50 to 105 mol %.

4. The golf ball according to claim 1, wherein the (A) is at least one of an acrylic acid and a methacrylic acid, and the (B) is at least one of an acrylic acid ester and a methacrylic acid ester.

5. The golf ball according to claim 1, wherein the metal ion is a magnesium ion.

6. The golf ball according to claim 1, wherein the $C_{3-8}$ α,β-unsaturated carboxylic acid (A) is selected from the group consisting of an acrylic acid, a methacrylic acid, a fumaric acid, a maleic acid, and a crotonic acid.

7. The golf ball according to claim 1, wherein the $C_{3-8}$ α,β-unsaturated carboxylic acid ester (B) is selected from the group consisting of methyl, ethyl, propyl, n-butyl, or isobutyl esters of an acrylic acid, methacrylic acid, fumaric acid, or maleic acid.

8. A golf ball, comprising:
a core comprising a center and one or more interlayers covering the center; and
a cover covering the core,
wherein at least one part or an interlayer is formed from a resin composition for a golf ball, comprising an ionomer resin consisting of a metal ion-neutralized copolymer of (A) a $C_{3-8}$ α,β-unsaturated carboxylic acid and (B) a $C_{3-8}$ α,β-unsaturated acid ester, the ionomer resin having a mass ratio of (A)/(B) of 10/90 to 25/75, and a degree of neutralization of 30 to 105 mol %.

* * * * *